US012598478B2

(12) United States Patent (10) Patent No.: US 12,598,478 B2
Jain et al. (45) Date of Patent: Apr. 7, 2026

(54) METHODS AND SYSTEMS FOR COVERAGE AREA DEFICIENCY VISUALIZATIONS

(71) Applicant: Rakuten Symphony, Inc., Tokyo (JP)

(72) Inventors: Rahul Jain, Indore (IN); Tarun Mishra, Indore (IN); Ashish Sharma, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 842 days.

(21) Appl. No.: 17/800,293

(22) PCT Filed: Apr. 26, 2022

(86) PCT No.: PCT/US2022/026286
§ 371 (c)(1),
(2) Date: Aug. 17, 2022

(87) PCT Pub. No.: WO2023/211423
PCT Pub. Date: Nov. 2, 2023

(65) Prior Publication Data
US 2024/0298188 A1 Sep. 5, 2024

(51) Int. Cl.
*H04W 24/08* (2009.01)
*H04B 17/318* (2015.01)
*H04W 16/18* (2009.01)

(52) U.S. Cl.
CPC .......... *H04W 16/18* (2013.01); *H04B 17/328* (2023.05); *H04W 24/08* (2013.01)

(58) Field of Classification Search
CPC ..... H04W 16/18; H04W 24/08; H04W 24/04; H04B 17/328
See application file for complete search history.

(56) References Cited

U.S. PATENT DOCUMENTS 7,085,550 B1 * 8/2006 Echols, Jr. ............ H04W 24/00
455/457
9,955,298 B1 4/2018 Haney
(Continued)

OTHER PUBLICATIONS

Taka Mizutori, "Make it even better than Nike+"—How to filter locations (Tracking Highly Accurate Location in Android vol. 3), medium.com, Apr. 4, 2018, pp. 1-15.
(Continued)

*Primary Examiner* — Kevin T Bates
*Assistant Examiner* — Hector Reyes
(74) *Attorney, Agent, or Firm* — Sughrue Mion, PLLC

(57) ABSTRACT
This disclosure provides methods, apparatuses, and computer-readable mediums for visualizing coverage area deficiencies. In an aspect, a method comprises retrieving, from a data storage, network performance data from a plurality of user wireless mobile devices; filtering the network performance data to narrow the dataset to data samples with accurate locations and dates; counting the number of data samples indicating a coverage deficiency in an area; comparing the number of data samples indicating the coverage deficiency in the area with a predefined threshold; rendering a map including the area; and displaying on the map a visual indicator of the coverage deficiency based on the number of data samples indicating the coverage deficiency in the area exceeding the predefined threshold.

18 Claims, 9 Drawing Sheets

(56) References Cited

U.S. PATENT DOCUMENTS

| | | | |
|---|---|---|---|
| 10,820,211 B1 * | 10/2020 | Bashir .................. | H04W 16/14 |
| 2003/0186693 A1 * | 10/2003 | Shafran ................ | H04W 16/18 |
| | | | 455/446 |
| 2006/0183487 A1 | 8/2006 | Allen et al. | |
| 2008/0049650 A1 * | 2/2008 | Coppage .............. | H04W 24/08 |
| | | | 370/310 |
| 2011/0039571 A1 * | 2/2011 | Bodine ................ | H04W 24/08 |
| | | | 455/67.11 |
| 2012/0038662 A1 * | 2/2012 | Dicklin ................. | G09G 5/377 |
| | | | 345/635 |
| 2016/0055832 A1 | 2/2016 | Dicklin et al. | |
| 2018/0054366 A1 * | 2/2018 | Hashmi .............. | H04L 43/0817 |
| 2020/0298719 A1 | 9/2020 | Kosseifi et al. | |

OTHER PUBLICATIONS

CISCO, Radio Resource Management White Paper, cisco.com, Dec. 17, 2021, pp. 1-3.
International Search Report for PCT/US2022/026286 dated Jul. 21, 2022.
Written Opinion for PCT/US2022/026286 dated Jul. 21, 2022.

* cited by examiner

METHODS AND SYSTEMS FOR COVERAGE AREA DEFICIENCY VISUALIZATIONS

CROSS REFERENCE TO RELATED APPLICATIONS

This application is a National Stage of International Application No. PCT/US2022/026286 filed Apr. 26, 2022.

TECHNICAL FIELD

Embodiments of the present disclosure relate to methods and systems for coverage area deficiency visualizations.

BACKGROUND

A major concern for telco operators is the existence of areas with no coverage, as such areas cut their consumers from operator services. Telco operators therefore plan their networks in such a way that no coverage gaps or holes are present between sites (e.g., macro cells, small cells, etc.) in a cluster. In reality, however, due to changing geographical conditions or other causes, signals within a particular area may deteriorate and coverage holes may emerge between sites.

Operators of cellular wireless networks therefore desire insight into the quality of coverage and information about network performance, user experience, network reachability, etc. Using such information, telco operators can fix gaps in coverage before they hamper the consumer experience.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Methods, apparatuses, and non-transitory computer-readable mediums for visualization of coverage area deficiencies are provided.

According to embodiments, a method of visualizing coverage area deficiencies includes: retrieving, from a data storage, network performance data from a plurality of user wireless mobile devices; filtering the network performance data to narrow the dataset to data samples with accurate locations and dates; counting the number of data samples indicating a coverage deficiency in an area; comparing the number of data samples indicating the coverage deficiency in the area with a predefined threshold; rendering a map including the area; and displaying on the map a visual indicator of the coverage deficiency based on the number of data samples indicating the coverage deficiency in the area exceeding the predefined threshold.

According to embodiments, an apparatus for visualizing coverage area deficiencies includes: a memory storage storing computer-executable instructions; and a processor communicatively coupled to the memory storage, wherein the processor is configured to execute the computer-executable instructions and cause the apparatus to: retrieve network performance data from a plurality of user wireless mobile devices; filter the network performance data to narrow the dataset to data samples with locations and dates; filter the dataset based on a preset location accuracy parameter; count a number of data samples indicating a coverage deficiency in an area; compare the number of data samples indicating the coverage deficiency in the area with a predefined threshold; render a map including the area; and display on the map a visual indicator of the coverage deficiency based on the number of data samples indicating the coverage deficiency in the area being determined to exceed the predefined threshold.

According to embodiments, a non-transitory computer-readable medium contains instructions, which when executed by one or more processors cause an apparatus to: retrieve network performance data from a plurality of user wireless mobile devices; filter the network performance data to narrow the dataset to data samples with locations and dates; filter the dataset based on a preset location accuracy parameter; count a number of data samples indicating a coverage deficiency in an area; compare the number of data samples indicating the coverage deficiency in the with a predefined threshold; render a map including the area; and display on the map a visual indicator of the coverage deficiency based on the number of data samples indicating the coverage deficiency in the area being determined to exceed the predefined threshold.

Additional embodiments will be set forth in the description that follows and, in part, will be apparent from the description, and/or may be learned by practice of the presented embodiments of the disclosure.

BRIEF DESCRIPTION OF THE DRAWINGS

The above and other aspects, features, and aspects of embodiments of the disclosure will be apparent from the following description taken in conjunction with the accompanying drawings, in which.

DETAILED DESCRIPTION

Figure 1:
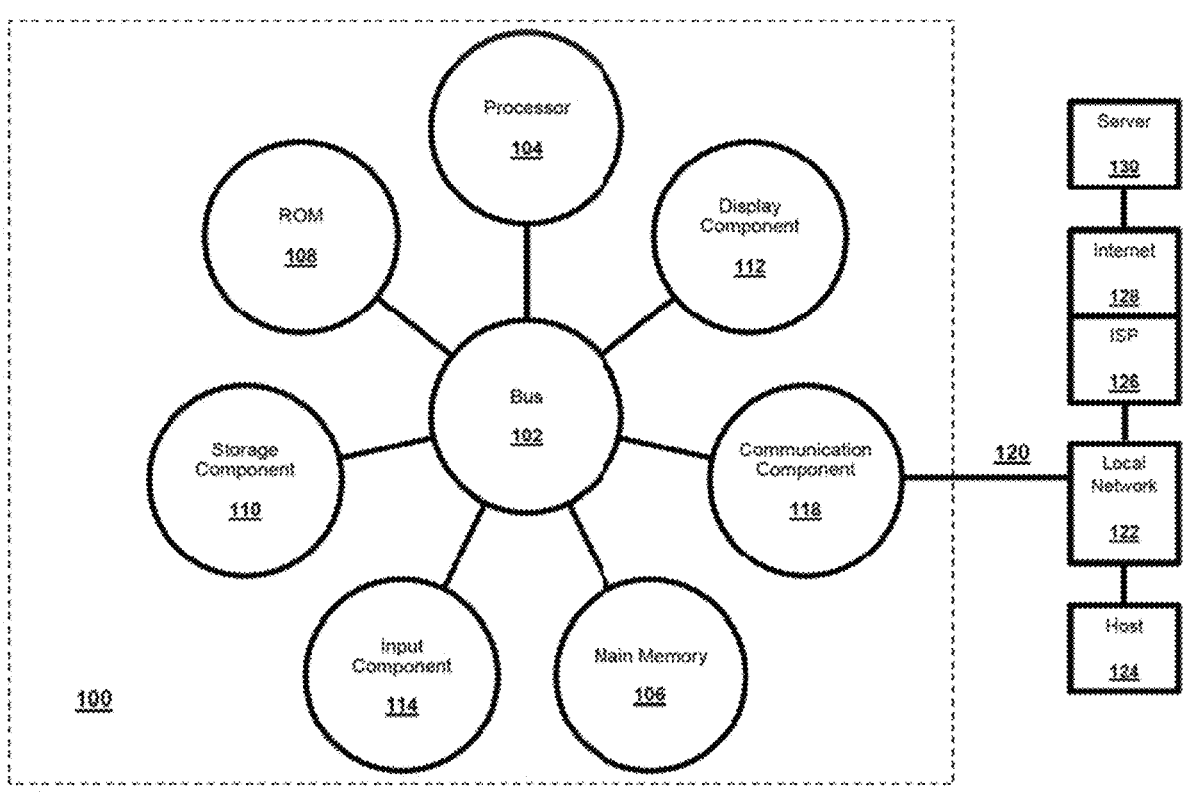
FIG. 1 is a diagram of an example device useful for coverage area deficiency visualizations in accordance with embodiments of the present invention.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

Mobile network operators invest significant resources in optimizing signal strength across their geographic areas. Traditional drive testing tools have been expensive and time consuming as network testers must physically drive along target routes to collect information regarding coverage with cellular RF drive test equipment. In telecommunications businesses with large geographic service areas, it is cumbersome to drive on every road in the service area and test coverage at each location along the way. Thus, network operators seek to employ various other approaches to gather data, assess network performance, and make improvements. One or more embodiments of the present disclosure may be worked with traditional drive test data but may also be used in conjunction with data gathered using a variety of other methods. Aspects of one of more embodiments offer a convenient solution that allows mobile network operators to effectively make use of that data.

FIG. 1 illustrates a device on which embodiments can be implemented. Device 100 includes a bus 102 or other communication mechanism for communicating information, and microprocessor 104 coupled with bus 102 for processing information.

Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Such instructions, when stored in non-transitory storage media accessible to processor 104, render computer system 100 into a special-purpose machine that is customized to perform the operations specified in the instructions.

Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, which can include alphanumeric and other keys, is coupled to bus 102 for communicating information and command selections to processor 104. Another type of user input device is used for cursor control such as a mouse, a trackball, or cursor direction keys for communicating direction information and command selections. Processor 104 can receive signals from input device 114 for controlling cursor movement and calculate associated changes to display 112. A cursor control input device typically has two degrees of freedom in two axes, a first axis (e.g., x) and a second axis (e.g., y), that allows the device to specify positions in a plane.

Computer system 100 may implement the techniques described herein using customized hard-wired logic, one or more ASICs or FPGAs, firmware and/or program logic which in combination with the computer system causes or programs computer system 100 to be a special-purpose machine. According to at least one embodiment, the techniques herein are performed by computer system 100 in response to processor 104 executing one or more sequences of one or more instructions contained in main memory 106. Such instructions may be read into main memory 106 from another storage medium, such as storage device 110. Execution of the sequences of instructions contained in main memory 106 causes processor 104 to perform the process operations described herein.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card, cable modem, satellite modem, or a modem to provide a data communication connection to a corresponding type of telephone line. As another example, communication interface 118 may be a local area network (LAN) card to provide a data communication connection to a compatible LAN. Wireless links may also be implemented. In at least one such implementation, communication interface 118 sends and receives one or more of electrical, electromagnetic and optical signals (as with all uses of "one or more" herein implicitly including any combination of one or more of these) that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are example forms of transmission media.

Computer system 100 can send messages and receive data, including program code, through the network(s), network link 120 and communication interface 118. In at least one embodiment of the Internet example, a server 130 might transmit a requested code for an application program through Internet 128, ISP 126, local network 122 and communication interface 118.

In embodiments, the received code may be one or more of executed by processor 104 as it is received, and/or stored in storage device 110, or other non-volatile storage for later execution.

Figure 2:
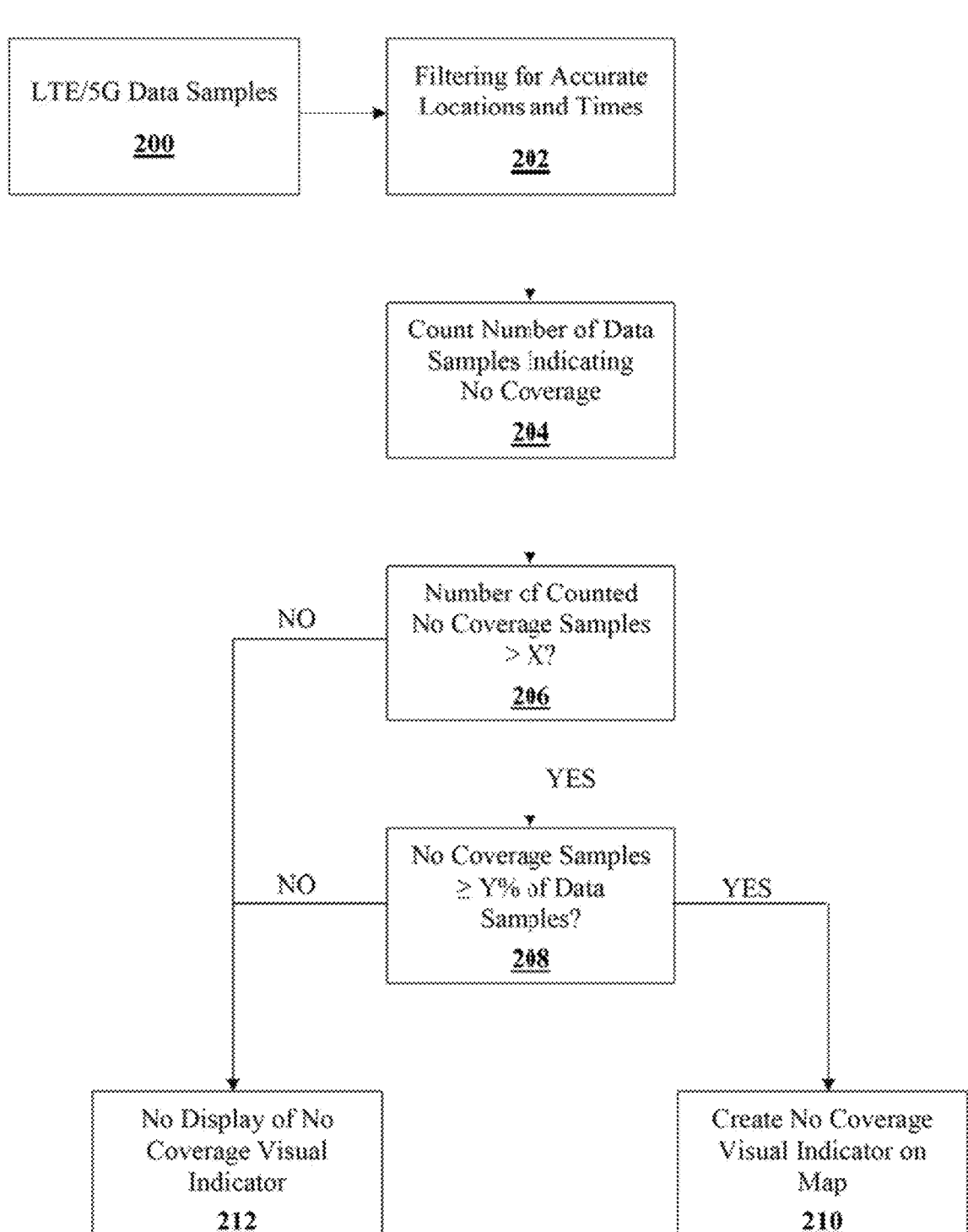
FIG. 2 is an example flow diagram for creating coverage area deficiency visualizations in accordance with embodiments of the present invention.

FIG. 2 is an example flow diagram for coverage area deficiency visualizations in accordance with one or more embodiments of the present invention. For example, the flow diagram of FIG. 2 corresponds to processing logic for hexagon creation on a map for indicating a coverage deficiency (or a no coverage area), where each hexagon corresponds to a particular coverage area on the map.

Referring to FIG. 2, at operation 200, telecommunication network (e.g., 5G, LTE, etc.) data samples are collected, retrieved, accessed, or otherwise introduced into the coverage area deficiency visualization. Network operators can collect samples themselves or outsource sample collection to third parties. Various organizations catalog LTE/5G data samples and network operators can use a Mobile Network Code field in the data samples to filter out those which do not come from their own network. Crowdsourcing wireless (both cellular and WiFi) network performance measurements (e.g. Reference Signal Received Power (RSRP), RSS, WiFi RSS, TCP/IP throughput, etc.) can enable a vast number of network monitoring applications. It can be of great interest to individual users, network operators (who often outsource these measurements to third parties) and researchers.

In an exemplary embodiment, data samples may be collected using a passive signal between cell phones and towers, or a very low-powered signal that is not intended to convey anything specific about or from the phone user. Instead, it exists so that the phone and the network can keep in touch with each other. This passive signal is consistent, so it does not constitute a specific ping. The signal carries a very small amount of information and within this information is a designation to the nearest tower. In some circumstances, even if a wireless network device is not able to achieve network coverage sufficient to, e.g., make a phone call, send a text message or retrieve a webpage, the passive signal of the relevant network operator is still being received by the mobile device. Thus, even when a mobile device does not have coverage, it can still generate passive data indicating the location of the device.

Passive data can include an indicator of whether or not a mobile device was able to achieve an active signal at a particular time and geographic location. If not, then the data sample will be marked as a no coverage sample. If coverage is available for the mobile device at the time of passive data collection, a reference signal received power (RSRP) will be measured and recorded as a data sample. The RSRP is measured in milli-decibels and measures the strength of the mobile network operator (MNO) signal. Successive passive data samples for a particular mobile device can also be analyzed. For example, if location accuracy is being measured by an active signal through an Android API for a particular mobile device, then a passive data sample from that mobile device indicating no coverage can be matched with an earlier active data sample from the same mobile device, and the location accuracy of the last active data sample with coverage can be used as an estimate for the location accuracy of the no coverage passive data sample.

Passive positioning relies on event location data that has been stored in the registries and databases of the MNOs or companies developing mobile apps. Usually when the data is generated directly by a MNO, it is for other purposes than of collecting the location such as billing, but contains data from mobile devices that can be linked to a location with specific geographical accuracy. A geographical reference table can be used to assign coordinates for the events by using antennae location reference data.

App-based passive positioning data comes from mobile devices contracted with a variety of mobile network operators and is obtained and stored either to the mobile device or to an app provider's central databases by the apps that are installed on the mobile devices. For a mobile network operator to use this app-based data, the mobile network operator must first isolate the data which is derived from the mobile network operator's own users. This is typically accomplished by a Mobile Network Code (MNC) which is a field in the dataset. Each cellular network is assigned a unique code or codes, called the MCC/MNC. MCC stands for mobile country code and identifies the nation of the mobile network operator. MNC identifies a particular mobile network operator specifically.

There are thousands of apps for all types of devices (Android, IOS, Windows phone, etc.) that use and store location information. Often, a user will be prompted to share location data with an application, and if a user agrees, that location data will be stored and may be made available to agents of a mobile network operator for network quality testing purposes. Users can control which apps can access and use the location of the user's device as well as when and how the location is used. For example, a user could allow Google Maps to use the location of the user's device to give driving directions, but not share the location with a game or social media app. Various apps may make user location data available in various ways which mobile network operators can access.

The difference between active and passive data collection methods is that for active positioning, a specific targeted request is made to locate the mobile device (request for location is made, location response is returned), while for passive positioning, historical data is collected and no active requests are sent. Active and passive data can both be monitored in real-time and historically, although in active positioning location requests have to be made regularly over a period of time to get the historical data.

Active data can also be used in embodiments. For example, if the designation of a mobile device to a particular tower of a mobile network operator changes, the mobile device notices and it sends out a ping to update its location and ensure the best possible communication with the overall network. A mobile device "ping" is the process of determining the location, with variable accuracy, of a mobile device at any given point in time by utilizing GPS capabilities. To "ping" in this context means to send a signal to a particular mobile device and have it respond with the requested data. This occurs via an active signal. When a mobile device is pinged, it can determine its latitude and longitude via GPS and sends these coordinates back via the SMS system (the same system used to send text messages). When a phone's location isn't up to date, it can cause communication to be very slow and it can even result in traffic being misrouted. If this tracking fails, then the carrier network won't be able to find the mobile device to send calls, texts, or data. A mobile device may be inoperable if it doesn't ping every time it gets in range of a new tower. Thus, pinging is important for proper operation of a mobile device. The number of pings primarily depends on mobile device usage. A phone will ping when it gets close to a new tower and when it needs to establish a connection (such as for a phone call). If left powered on, unused and stationary, most phones send a handful of pings each day. Data samples can be collected for each ping including a reference signal received power (RSRP).

At operation 202 of FIG. 2, one or more filters are applied to ensure validity of the data samples collected at operation 200. For example, one filter may exclude all data samples which lack latitudes and longitudes. A second filter may exclude all data samples which lack a collection time. A third filter may exclude all data samples which lack an accurate location. Location accuracy could be measured for example by the Android API of the device of a user contributing to the dataset.

According to an embodiment, if the overall number of data samples for a particular area (i.e., an overall number of data samples that satisfy the condition(s) of the filter(s)) is less than a predetermined threshold (e.g., 10), then the process ends for that area and no visualization (e.g., hexagon) will be displayed on the map for that area. The predetermined minimum threshold is to ensure the accuracy of the no coverage or coverage deficiency determination. This threshold may be set by a user, a telco operator, etc.

At operation 204, for a particular predetermined area (corresponding to a coverage area), the number of data samples which satisfy the condition(s) of the filter(s) and which indicate a lack of network coverage are counted. For example, a data sample that does not have an RSRP value may be counted as a no coverage area (or no coverage) sample. According to another embodiment, a data sample with an RSRP value below a predetermined threshold may be counted as a no coverage area sample. The predetermined threshold may be set by a user, a telco operator, etc. By way of further example, a spreadsheet could contain a field with text strings indicating no coverage at a particular date and time, and the no coverage text strings could be counted.

At operation 206, it is determined if the number of counted no coverage samples is greater than a predetermined value (X), such as zero. If the number of data samples indicating lack of coverage is greater than a predetermined value, e.g., nonzero (YES at operation 206), this means that there is data indicating no coverage at particular date(s) and time(s), and the process of creating a visualization continues to operation 208.

At operation 208, the number of data samples indicating lack of coverage is compared to a predetermined threshold (Y). For example, the threshold to create a no coverage visualization might be 90% of data samples indicating no coverage at the particular area. The threshold may be set by a user, a telco operator, etc.

If the counted number of no coverage data samples satisfies the threshold condition of operation 208, e.g., if the number is more than 90% of the total data samples for that particular area, then a visualization of the geographic location of a coverage deficiency is created at operation 210. For example, an area in which 90% or more of data samples obtained over a measurement interval and indicating no coverage is depicted on a map (e.g., a global Mercator projection) with a visual indicator indicating no network coverage. By way of example, the visual indicator may be a hexagon that is colored or shaded with a predetermined color (e.g., gray) indicative of no coverage.

Conversely, if the number of counted no coverage samples is less than the aforementioned threshold (X), e.g., if the number is zero (NO at operation 206), or if the threshold condition of operation 208 is not satisfied (NO at operation 208), then no visual indicator indicative of no coverage is created and displayed for that area at operation 212.

The process of FIG. 2 may be performed for each of a plurality of areas (corresponding to coverage areas) on a predetermined location of a map (e.g., a country, a prefecture, a state, a mobile communications network overall coverage area, etc.).

Further, while the process of FIG. 2 is for creating and adding visualizations indicative of no coverage, it is understood that additional visualizations (e.g., hexagons) may be created and added for areas that do not have no coverage. For example, additional thresholds and colors, shadings, or other distinguishing features of visual indicators (e.g., hexagons) may be used to indicate areas with coverage, or areas with different levels of coverage (e.g., a first color if at least X % of samples have RSRP dBm values greater than a first threshold or within a first predetermined range, a second color if at least X % or Y % of samples have RSRP dBm values greater than a second threshold or within a second predetermined range, etc.).

Figure 3:
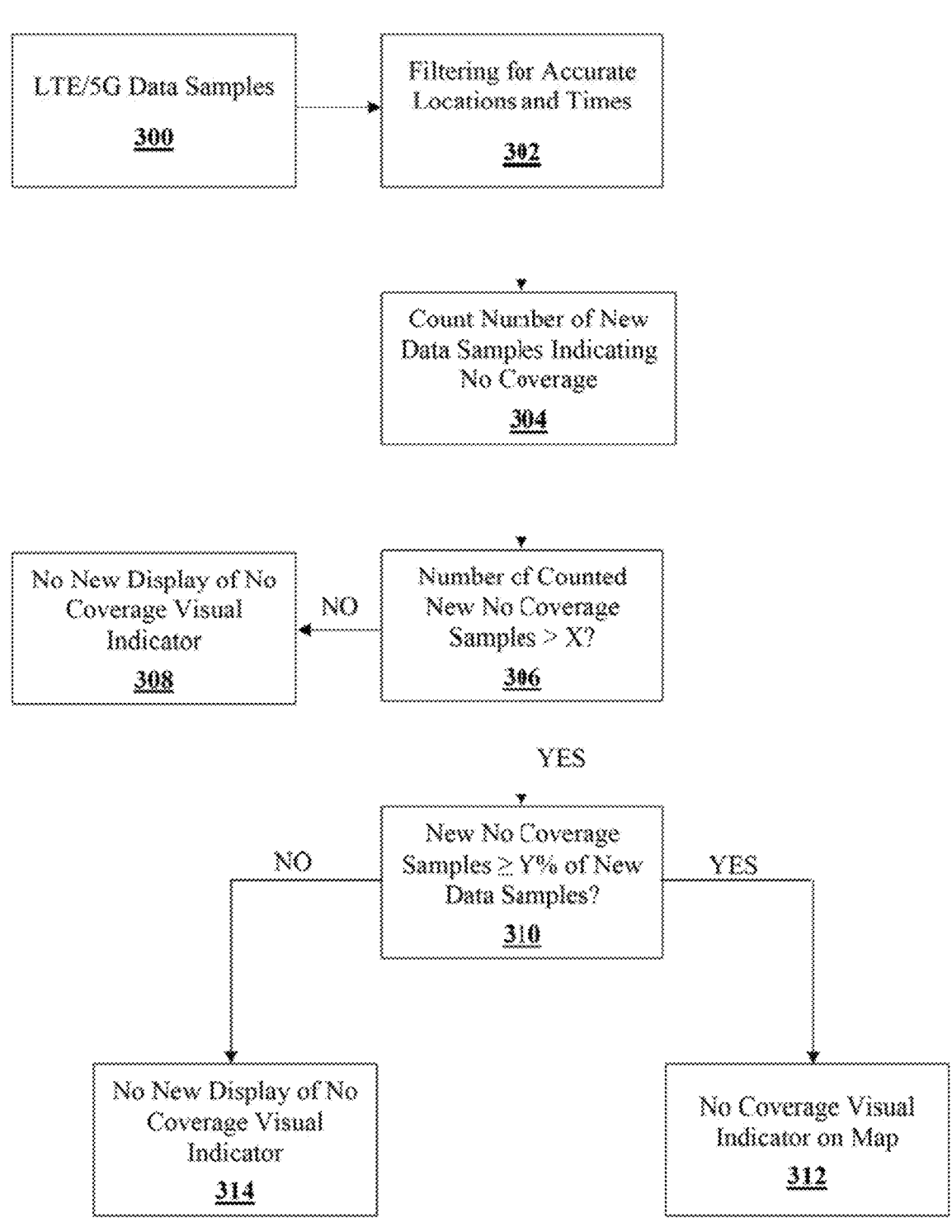
FIG. 3 is an example flow diagram for updating coverage area deficiency visualizations in accordance with embodiments of the present invention.

FIG. 3 is an example flow diagram for updating coverage area deficiency visualizations in accordance with one or more embodiments of the present invention. For example, the flow diagram of FIG. 3 may correspond to processing logic for updating coverage visualizations (e.g., hexagons) based on some predetermined periodicity (e.g., daily).

Referring to FIG. 3, at operation 300, LTE/5G data samples are continuously collected or collected over some interval. A network operator might analyze samples received the previous night for example and create or update coverage area deficiency visualizations with the data at the beginning of the workday based on the data samples collected over that interval (e.g., daily) or based on data samples collected over a predetermined plurality of collection intervals (e.g., over the past week).

At operation 302 of FIG. 2, one or more filters are applied to ensure validity of the incoming data samples collected at operation 300. For example, one filter may exclude all data samples which lack latitudes and longitudes. A second filter may exclude all data samples which lack a collection time. A third filter may exclude all data samples which lack an accurate location. Location accuracy could be measured for example by the Android API of the device of a user contributing to the dataset.

According to an embodiment, if the overall number of data samples collected at the interval for a particular area (i.e., an overall number of new data samples that satisfy the condition(s) of the filter(s)) is less than a predetermined threshold (e.g., 10), then the process ends for that area and no visualization (e.g., hexagon) will be displayed on the map for that area (or, in one or more other embodiments, a previously-created visualization may be maintained). The predetermined minimum threshold is to ensure the accuracy of the no coverage or coverage deficiency determination. This threshold may be set by a user, a telco operator, etc.

At operation 304, for a particular area, the number of collected new data samples which satisfy the conditions of the filters (i.e., are not excluded by the filtering) and which indicate a lack of network coverage are counted. For example, a data sample that does not have an RSRP value may be counted as a no coverage area (or no coverage) sample. According to another embodiment, a data sample with an RSRP value below a predetermined threshold may be counted as a no coverage area sample. The predetermined threshold may be set by a user, a telco operator, etc.

At operation 306, it is determined if the number of counted no coverage samples is greater than a predetermined value (X), such as zero. If the number of new data samples indicating lack of coverage is greater than a predetermined value, e.g., nonzero (YES at operation 306), this means that there is data indicating no coverage at particular date(s) and time(s), and the process of creating a visualization continues to operation 310.

If, however, the counted number of data samples is not greater than the predetermined number (e.g., 0) (NO at operation 306), then no visualization indicating lack of coverage is displayed, at operation 308. Therefore, if a no coverage area visual indicator had previously been displayed at the prior interval for that area, the previous visual indicator is removed. Further, a visual indicator indicative of coverage at that area (or indicative of a strength of coverage, e.g., an average of RSRP values for data samples having RSRP values among the new data samples for that area) may be displayed. For example, the color of the visual indicator (e.g., hexagon) for that area may change from gray (indicating no coverage) to red (indicating weak coverage), yellow (indicating medium coverage), or green (indicating strong coverage).

At operation 310, the number of new data samples indicating lack of coverage is compared to a predetermined threshold (Y). For example, the threshold to create (or maintain) a no coverage visualization might be 90% of data samples indicating no coverage at the particular area. The threshold may be set by a user, a telco operator, etc.

If the counted number of no coverage data samples satisfies the threshold condition of operation 310, e.g., if the number is more than 90% of the total new data samples for that particular area, then a visualization of the geographic location of a coverage deficiency is created (or maintained) at operation 312. For example, an area in which 90% or more of new data samples indicate no coverage is depicted on a map (e.g., a global Mercator projection) with a visual indicator indicating no network coverage. By way of example, the visual indicator may be a hexagon that is colored or shaded with a predetermined color (e.g., gray) indicative of no coverage.

Conversely, if the threshold condition of operation 310 is not satisfied (NO at operation 310), then no visual indicator indicative of no coverage is created (or maintained) and displayed for that area. Further, a visual indicator indicative of coverage at that area (or indicative of a strength of coverage, e.g., an average of RSRP values for data samples having RSRP values among the new data samples for that area) may be displayed. For example, the color of the visual indicator (e.g., hexagon) for that area may change from gray (indicating no coverage) to red (indicating weak coverage), yellow (indicating medium coverage), or green (indicating strong coverage).

The process of FIG. 3 may be performed for each of a plurality of areas (corresponding to coverage areas) on a predetermined location of a map (e.g., a country, a prefecture, a state, a mobile communications network overall coverage area, etc.). Further, while the above-described processing logic is performed with only new data samples, it is understood that one or more other embodiments are not limited thereto. For example, in one or more other embodiments, new data samples could be combined with data samples used for a previous visualization or collected over a predetermined plurality of previous intervals (e.g., one week).

Figure 4:
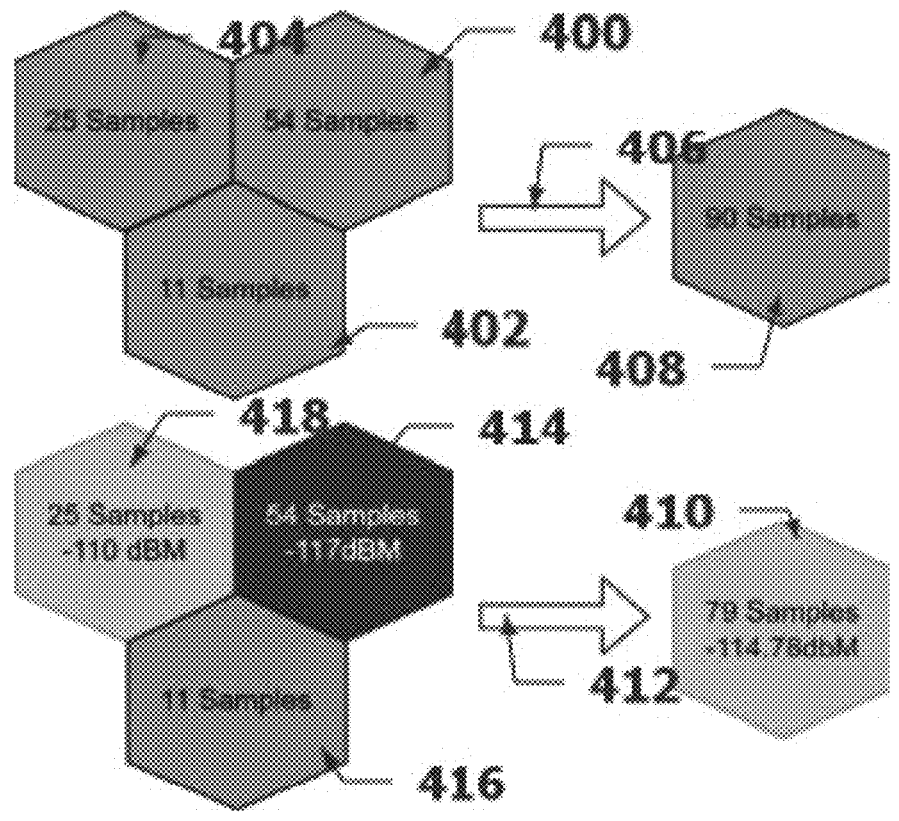
FIG. 4 illustrates aggregation logic in response to a user instruction to alter the zoom level of the map.

FIG. 4 illustrates aggregation logic in response to a user instruction to alter the zoom level of the map.

Hexagon 400 is a high zoom level area of no coverage for which 54 samples have been obtained. In other words, 54 samples have longitudes and latitudes which fall within the area of the web Mercator represented by hexagon 400.

Hexagon 402 is a high zoom level area of no coverage for which 11 samples have been obtained. In other words, 11 samples have longitudes and latitudes which fall within the area of the web Mercator represented by hexagon 402.

Hexagon 404 is a high zoom level area of no coverage for which 25 samples have been obtained. In other words, 25 samples have longitudes and latitudes which fall within the area of the web Mercator represented by hexagon 404.

Aggregation step 406 represents a zoom operation to a lower zoom level. Hexagons 400, 402, and 404 are aggregated by this operation. Because hexagons 400, 402 and 404 are all no coverage hexagons, the aggregation is straightforward and the number of samples in the three hexagons can simply be summed and used to create a larger no coverage hexagon.

Hexagon 408 is a low zoom level area of no coverage combining the 90 samples in hexagons 400, 402, and 404. Since each of hexagons 400, 402, and 404 are no coverage hexagons, the aggregated hexagon will also be a no coverage hexagon. More complex logic is needed when aggregating coverage area hexagons with no coverage hexagons.

Hexagon 414 is high zoom level area with −117 dBM RSRP. It comprises 54 samples having longitudes and latitudes which fall within the area of the web Mercator represented by hexagon 414.

Hexagon 416 is a high zoom level area of no coverage for which 11 samples have been obtained. It comprises 11 samples having longitudes and latitudes which fall within the area of the web Mercator represented by hexagon 416.

Hexagon 418 is high zoom level area with −110 dBM RSRP. It comprises 25 samples having longitudes and latitudes which fall within the area of the web Mercator represented by hexagon 418.

Aggregation step 412 combines one or more no coverage hexagons with one or more hexagons with RSRP values. The total number of samples is compared against a KPI threshold to determine whether the low zoom level hexagon to be aggregated should be labeled as a no coverage hexagon, or if the low zoom level hexagon should display an RSRP based on the weighted average of the high zoom level hexagons with RSRP values.

Hexagon 410 is a low zoom level area with −114.78 dbM reference signal received power (RSRP). The RSRP for hexagon 410 is calculated as a weighted average of the RSRP of high zoom level hexagons 414, 416, and 418. When the weighted average of the RSRP is calculated, no coverage samples are excluded.

Figure 5:
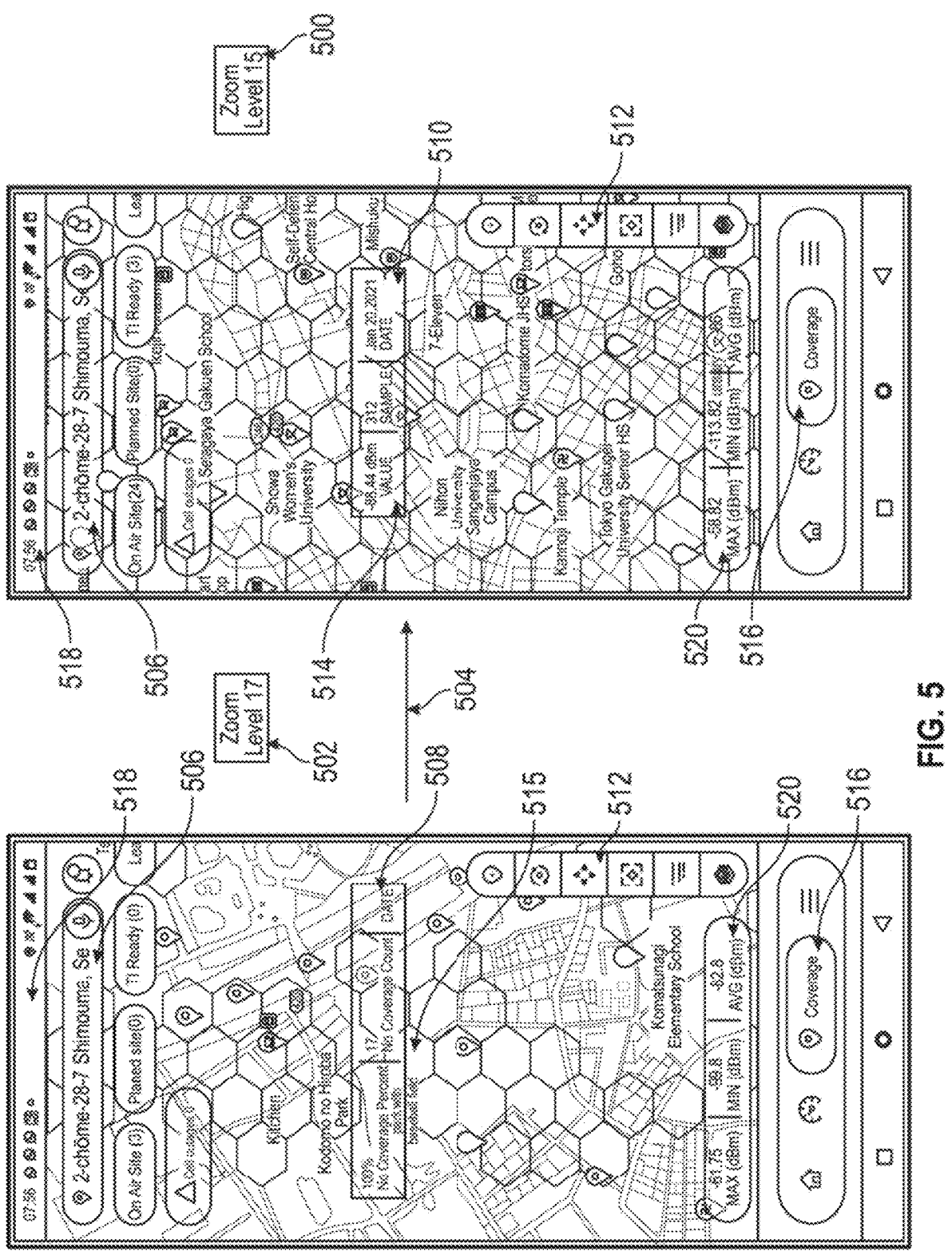
FIG. 5 illustrates a change in a user interface in response to a user instruction to alter the zoom level of the map.

FIG. 5 illustrates a change in a user interface in response to a user instruction to alter the zoom level of the map.

Zoom level indicator 500 is at zoom level 17. At zoom level 17, the area of a single hexagon is 2,500 square meters. At the lowest zoom level, the world is contained in one map tile. At the next higher zoom level, the world is two tiles wide and two tiles high (2×2), at the next level above that, the grid is 4×4, then 8×8, 16×16, and so on up to the maximum zoom for a particular region. In other words, at each zoom level the tiles that make up the complete map of the world form a grid in which the number of tiles is equal to two to the power of two multiplied by the zoom level Zoom level indicator 502 is at a lower zoom level, zoom level 15. At zoom level 15, the area of a single hexagon is 40,000 square meters. A series of different maps with slightly different information are displayed at each zoom level. Zoom level can be indicated and controlled in a map by the vertical zoom slider. Whenever the zoom level is changed, a different map is shown, i.e., the aggregation operation of FIG. 4 is performed.

Zoom operation 504 conducts the aggregation calculations described in FIG. 4. That is, no coverage and coverage samples are aggregated and the aggregate number of no coverage samples compared to a preset threshold. If in the combined number of samples the no coverage threshold is not met, then a coverage area will display at a lower zoom level even though areas of no coverage could be found inside of the same geographic area if the zoom level were higher.

Address 506 is an address displayed on a Mercator projection. Many major online street mapping services (such as Bing Maps, Google Maps, Mapbox, MapQuest, OpenStreetMap, Yahoo! Maps, and others) use a variant of the Mercator projection for their map images called Web Mercator or Google Web Mercator which is often used in embodiments for creating map images.

First coverage data 508 is a no coverage count and a no coverage percentage. The no coverage count is 17 and the no coverage percentage is 100%.

Second coverage data 510 comprises 312 data samples with an average RSRP of −88.55 dBm. As the zoom level is lower, the number of data samples tends to become higher as hexagons encompass larger geographic areas with more samples.

Map movement toolbar 512 provides a user with various options to navigate the map. For instance, a user could center the map on the user's current location. Example commands include ones which allow a user to measure the distance between points, rotate the map, and zoom the map in or out.

KPI hexagon 514 is a visualization displayed based on first coverage data 508. It is colored based on the RSRP value associated with the geographic area described by KPI hexagon 514. Since the RSRP value of −88.44 indicates an adequate signal, KPI hexagon 514 would be marked with a color or other visual representation indicating that the signal strength is adequate in this geographic area.

The geographic region represented by KPI hexagon 514 comprises 16 hexagons the size of no coverage hexagon 515. When the map is viewed at a lower zoom level, it is possible that no coverage areas which can be spotted at a higher zoom level will not be visible on the map when displayed at a lower zoom level. That is the case with KPI hexagon 514 as no coverage hexagon 515 lies within the region demarcated by KPI hexagon 514 and no coverage hexagon 515 can be spotted within the region upon a user's command to zoom the map to a higher zoom level.

No coverage hexagon 515 is a visualization displayed based on second coverage data 510. No coverage hexagon 515 could be visually distinguished by a color used to fill the shape, by text, by an image, by an animation, or by a video, to give a few non-limiting examples.

Command toolbar 516 allows the user to execute commands associated with the device or application. For example, commands could allow a user to make recordings.

Device status information 518 displays parameters related to the operating conditions of the device and its own communications network service. More and/or different indicators could be displayed at other times or in other embodiments.

Average, min and max network strength data 520 shows the highest RSRP, lowest RSRP, and average RSRP in the geographic area displayed in the map window.

Figure 6:
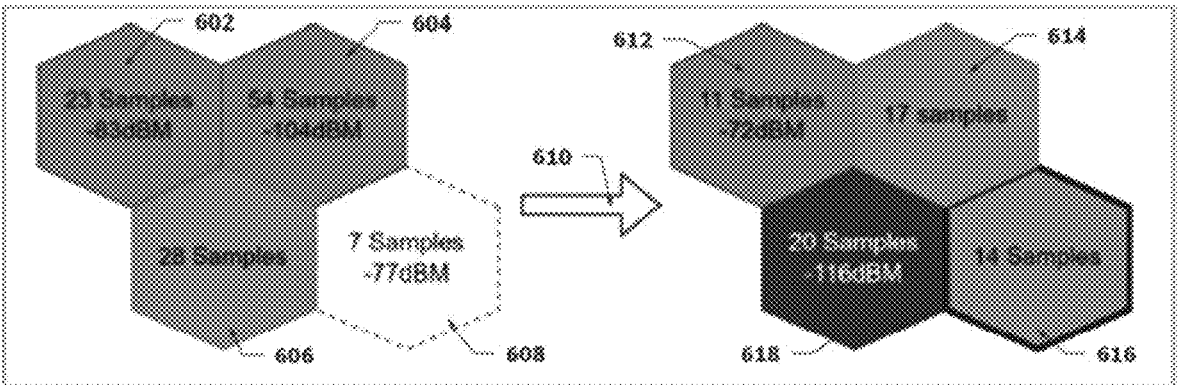
FIG. 6 illustrates processing logic for updating a coverage area deficiency visualization.

FIG. 6 illustrates processing logic for updating a coverage area deficiency visualization.

Hexagon 602 is a coverage area comprising 23 samples with −83 dBM RSRP, prior to an update.

Hexagon 604 is a coverage area comprising 54 samples with −104 dBM RSRP, prior to an update.

Hexagon 606 is a no coverage area comprising 28 samples, prior to an update.

Shell 608 does not have enough data to be rendered as a hexagon, prior to an update. It comprises only 7 samples, with RSRP −77 dBM.

Update step 610 introduces new data for each of the geographic areas represented by hexagons 602-608. For example, update step 610 could be a daily update.

Hexagon 612 is a coverage area comprising 11 samples with −72 dBM RSRP, after an update. The area comprises the same geographic area as hexagon 602. In other words, the zoom level has not changed between hexagon 612 and hexagon 602.

Hexagon 614 is a no coverage area comprising 17 samples, after an update. The area comprises the same geographic area as hexagon 604. In other words, the zoom level has not changed between hexagon 614 and hexagon 604.

Hexagon 616 is a no coverage area comprising 14 samples, after an update. The area of coverage deficiency comprises the same geographic area as shell 608.

Hexagon 618 is a coverage area comprising 20 samples with −72 dBM RSRP, after an update. The area comprises the same geographic area as hexagon 606.

Figure 7:
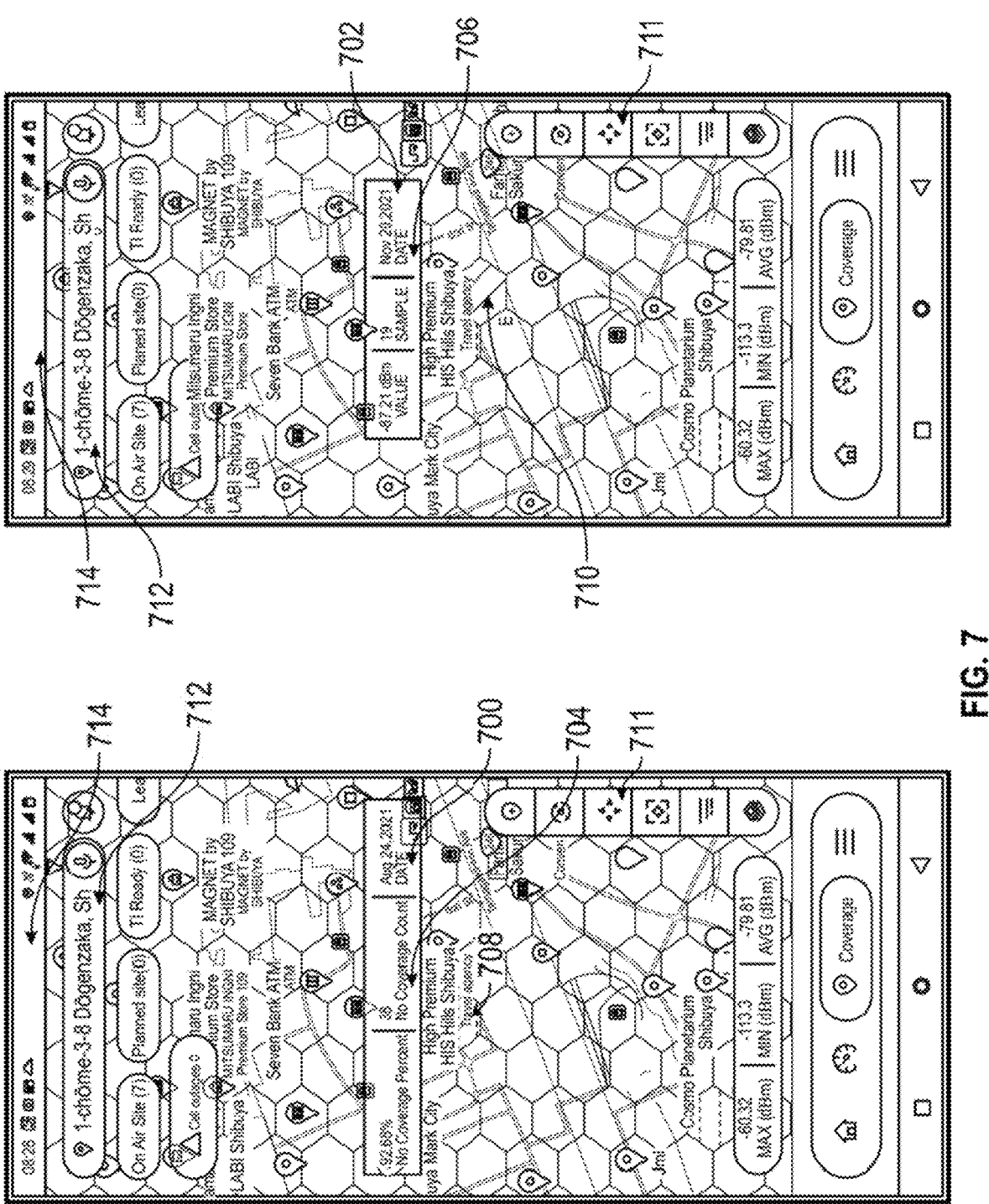
FIG. 7 illustrates a change in a user interface in response to an update in a coverage area deficiency visualization.

FIG. 7 illustrates a change in a user interface in response to an update in a coverage area deficiency visualization.

In the example of FIG. 7, first date 700 is Aug. 24, 2021. Data used for the visualization labeled by first date 700 was compiled as of this date. In an exemplary embodiment data might be updated once per day, so the date field simply lists a date. In other embodiments specific times of day could be listed.

Further, in the example of FIG. 7, second date 702 is Nov. 21, 2021. Data used for the visualization labeled by first date 702 was compiled as of this date. An embodiment could be configured to display in this field the most recent date on which samples were received, for example.

First coverage data 704 is a no coverage count. In an exemplary embodiment, coverage data can either be a no coverage count and a no coverage percent, or an RSRP value and sample size. A no coverage count indicates the number of data samples where there was no LTE or 5G coverage within the geographic area defined by a no coverage hexagon. An RSRP value indicates the network provided a concomitant coverage quality within the geographic area defined by a KPI hexagon.

Second coverage data 706 is a sample size of 19 with an average dBm value of −47.21, which indicates excellent signal strength. The strength of a cellular signal can be accurately measured using decibel milliwatts, or dBms. Signal strength in dBms is expressed as a negative number and typically falls into a range that spans from −30 dBm to −110 dBm, with numbers closer to zero expressing stronger cellular signals. Essentially, this means that −77 dBm is a stronger signal than −86 dBm. Signals better than −85 decibels may be considered usable and strong, and it may be rare to see a signal stronger than −50 dBm. At the other end of the spectrum, a signal that is weaker than −100 dBm may likely be too problematic to be useful—resulting in dropped calls and incomplete data transmissions.

No coverage hexagon 708 is a visualization displayed based on first coverage data 704. No coverage hexagon 708 could be visually distinguished by a color used to fill the shape, by text, by an image, by an animation, or by a video, to give a few non-limiting examples.

KPI hexagon 710 is colored based on the RSRP value associated with the geographic area described by KPI hexagon 710. Since the RSRP value of −47.21 indicates an extremely strong signal, KPI hexagon 710 would be marked with a color or other visual representation indicating that the signal strength is high in this geographic area.

Map movement toolbar 711 provides a user with various options to navigate the map. For instance, a user could center the map on the user's current location. Example commands include ones which allow a user to measure the distance between points, rotate the map, and zoom the map in or out.

Address 712 allows a user to enter an address associated with an area of the global Mercator map. The global Mercator map will center on the address entered by a user. However, because the Mercator projects the poles at infinity, a map using the Web Mercator projection cannot show the poles. Services such as Google Maps cut off coverage at 85.051129° north and south. The value 85.051129° is the latitude at which the full projected map becomes a square Device status information 714 displays parameters related to the operating conditions of the device and its own communications network service. More and/or different indicators could be displayed at other times or in other embodiments.

Figure 8:
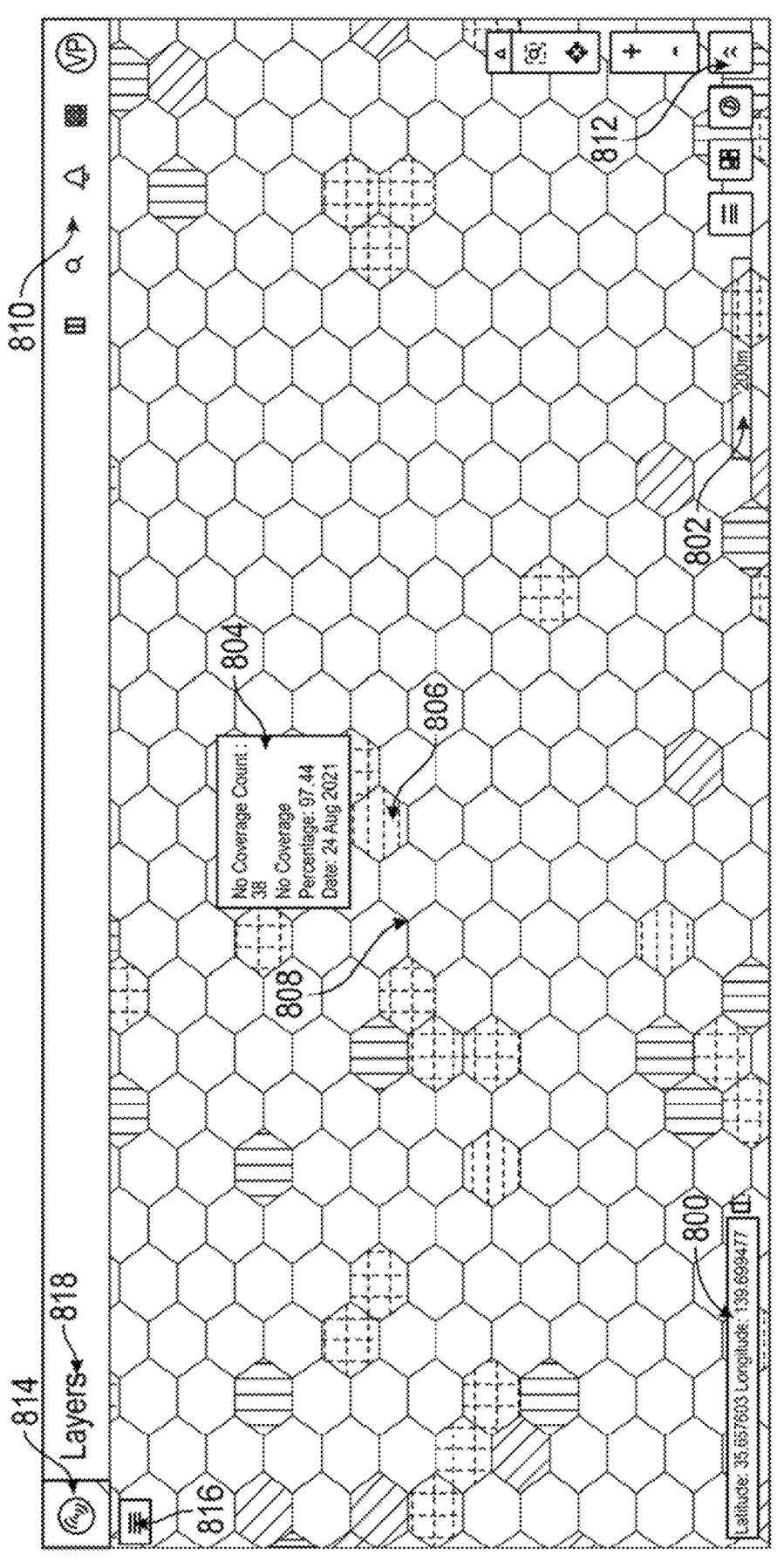
FIG. 8 illustrates a user interface for displaying a coverage area deficiency visualization.

FIG. 8 illustrates a user interface displaying a coverage area deficiency visualization.

Latitude and longitude 800 displays the precise coordinates of a hexagon selected by a user. Embodiments use the world geodetic system, a standard for use in cartography. It is the referenced system used by the Global Positioning System (GPS). The latest revision is WGS 84, which is maintained by the United States National Geospatial-Intelligence Agency.

Scale 802 correlates the geographic distance between points on the map to a distance on the screen. Scale 802 is 200 meters and the line described by scale 802 indicates the distance on the screen which correlates to 200 meters of geographic distance.

No coverage data 804 is a no coverage count. In an exemplary embodiment, coverage data can either be a no coverage count and a no coverage percent, or an RSRP value and sample size. No coverage data 804 has a no coverage count of 38 and a no coverage percentage of 97.44. In other words, one sample out of 39 did have coverage. The no coverage count indicates the number of data samples where there was no LTE or 5G coverage within the geographic area defined by a no coverage hexagon.

No coverage hexagon 806 is a visualization displayed based on no coverage data 804. No coverage hexagon 806 could be visually distinguished by a color used to fill the shape, by text, by an image, by an animation, or by a video, to give a few non-limiting examples.

Adjacent hexagons 808 represent geographic regions nearby and adjacent to no coverage hexagon 806. Adjacent hexagons 808 are KPI hexagons because network coverage exists in the corresponding geographic areas.

Device toolbar 810 displays commands related to the operating conditions of the device and the user account of a user operating the application. For example, by clicking on device toolbar 810, a user could change the user account to be that of a different user.

Map movement toolbar 812 provides a user with various options to navigate the map. For instance, a user could center the map on the user's current location. Example commands include ones which allow a user to measure the distance between points, rotate the map, and zoom the map in or out.

Application command menu 814 triggers one or more preset options to be presented to a user. Upon selection by a user, a further action is performed on the user interface. For example, a user may wish to print the user interface view currently being displayed. Application command menu 814 can include a print command.

Map command menu 816 in this exemplary embodiment allows a user to customize the user interface view of the map according to the user's preferences. A user could, for example, select the colors or other visual indicators used to visualize no coverage areas and set parameters related to the fonts of text elements.

Title 818 is text displayed as a title for this user interface view. This text cannot be modified by the user, clicked on or otherwise used to trigger execution of commands. Other embodiments will use a different title, and in embodiments a user may be able to alter the title, or the title could change dynamically based on preset parameters.

Figure 9:
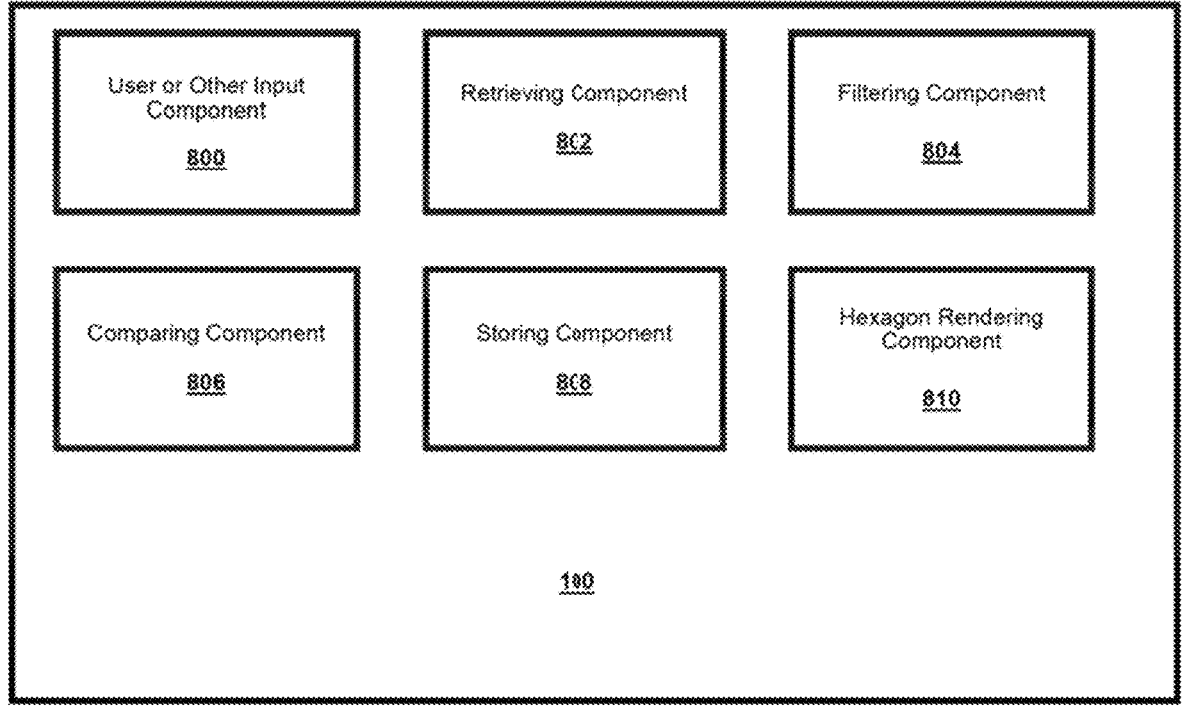
FIG. 9 illustrates arithmetic and logic units within a device in accordance with embodiments of the present invention.

FIG. 9 illustrates arithmetic and logic units within a device, such as device 100 illustrated in FIG. 1 containing processor 104, configured for an example embodiment.

User or other input component 800 receives input from a user or an automated routine to select data to be used for coverage area deficiency visualizations. Input could be received for example at a keyboard or a cursor control apparatus as user or other input component 802 may include one or more components that permit a device (e.g., device 100) to receive information, such as via user input (e.g., a touch screen, a keyboard, a keypad, a mouse, a stylus, a button, a switch, a microphone, a camera, and the like). User or other input component 800 can include an external connection to a network location or external storage. User or other input component 800 can be configured to receive communications (e.g., wired, wireless) from another apparatus. User or other input component 800 may receive communications, such as control information, data communications, or a combination thereof, from another apparatus. User or other input component 800 may provide received communications to one or more other components such retrieving component 802. In some embodiments, user or other input component 800 may include one or more antennas, a receive processor, a controller/processor, a memory, or a combination thereof.

Retrieving component 802 assembles data based on instructions from user or other input component 800. Retrieving component 802 may be configured to or may comprise means for retrieving LTE/5G data samples from a database. Retrieving component 802 is configured for identifying and extracting data based on a query provided by the user or application. Applications and software generally use various queries to retrieve data in different formats and embodiments are not limited to any specific applications. Retrieving component 802 may be configured to automatically or periodically retrieve data from user or other input component 800 (i.e., from a device's internal storage or from external storage or from a network location) and thus provides a way for multiple users to dynamically access coverage area deficiency visualizations.

Filtering component 804 uses filters to ensure validity of the incoming data samples retrieved by retrieving component 802. For example, one filter may exclude all data samples which lack latitudes and longitudes. A second filter may exclude all data samples which lack a collection time. A third filter may exclude all data samples which lack an accurate location. Location accuracy could be measured for example by the Android API of the device of a user contributing to the dataset. Filtering component 804 receives raw data from retrieving component 802 and transmits filtered data to comparing component 806.

Comparing component 806 compares the number of data samples which indicate a lack of network coverage with a predefined threshold. For example, a spreadsheet could contain a field with text strings indicating no coverage at a particular date and time, and the number of no coverage text strings could be compared with an absolute or relative threshold. An absolute threshold might be 10 data samples, and a relative threshold might be 90% of data samples indicating no coverage in a geographic area. If comparing component 806 determines that there are fewer than e.g., 10 data samples, no data will be stored to be used in a visualization because there is too little data to indicate a valid result. If there is sufficient data, either no coverage data or average RSRP data will be sent to storing component 808, depending on whether the relative threshold is met indicating no coverage data predominates in a particular geographic area.

Storing component 808 may be configured to or may comprise means for storing no coverage and RSRP coverage data. The data can be used at hexagon rendering component 810. Storing component 808 may store data in a variety of format for example as comma-separated values. Data can be stored in among other locations in working memory, in a storage location local to a device or storage may occur in some external database, external server, or web application.

Hexagon rendering component 810 may be configured to or may comprise means to render hexagons. Hexagon rendering component 810 can be connected to an output device which displays pixels on a user interface according to the instructions of hexagon rendering component 810. Although this is only an exemplary embodiment and other embodiments will use different shapes or visual indicators, hexagons are often chosen to present information because hexagons can completely cover a two-dimensional map with no empty spaces; in other words, the border of each hexagon can be lined up exactly with the borders of six other hexagons. The extent of the map and the number of hexagons depicted in the model is variable and depends in part on the extent of the geographic service area of the mobile network operator.

The foregoing disclosure provides illustration and description, but is not intended to be exhaustive or to limit the implementations to the precise form disclosed. Modifications and variations are possible in light of the above disclosure or may be acquired from practice of the implementations.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A computer-implemented method for visualizing coverage area deficiencies on a map, the method comprising:
    retrieving, from a data storage, network performance data from a plurality of user wireless mobile devices;
    filtering the network performance data to narrow the dataset to data samples with accurate locations and dates;
    counting the number of data samples indicating a coverage deficiency in an area;
    comparing the number of data samples indicating the coverage deficiency in the area with a predefined threshold;
    rendering a map including the area; and
    displaying on the map a visual indicator of the coverage deficiency based on the number of data samples indicating the coverage deficiency in the area exceeding the predefined threshold.

2. The method according to claim 1, further comprising updating the displaying of the visual indicator based on incoming network performance data retrieved from the data storage on a periodic basis.

3. The method according to claim 1, wherein the visual indicator comprises a hexagon having a predetermined color corresponding to the coverage deficiency.

4. The method according to claim 3, wherein the colored hexagon is displayed on the map adjacent to six other colored hexagons.

5. The method according to claim 1, further comprising displaying the map without any visual indicator over another area in which a number of data samples indicating the coverage deficiency in the other area does not exceed the predefined threshold.

6. The method according to claim 1, further comprising adjusting the visual indicator based on predefined aggregation logic in response to a user instruction to alter the zoom level of the map.

7. The method according to claim 1, wherein the network performance data comprises at least one of LTE network data and 5G network data.

8. The method according to claim 1, wherein the area corresponds to a cluster of cell sites defined relative to a global Mercator projection.

9. An apparatus for visualizing coverage area deficiencies on a map, the apparatus comprising:

a memory storage storing computer-executable instructions; and a processor communicatively coupled to the memory storage, wherein the processor is configured to execute the computer-executable instructions and cause the apparatus to:

retrieve network performance data from a plurality of user wireless mobile devices;

filter the network performance data to narrow the dataset to data samples with locations and dates;

filter the dataset based on a preset location accuracy parameter;

count a number of data samples indicating a coverage deficiency in an area;

compare the number of data samples indicating the coverage deficiency in the area with a predefined threshold;

render a map including the area; and display on the map a visual indicator of the coverage deficiency based on the number of data samples indicating the coverage deficiency in the area being determined to exceed the predefined threshold.

10. The apparatus according to claim 9, wherein the visual indicator comprises a hexagon having a predetermined color corresponding to the coverage deficiency.

11. The apparatus according to claim 9, wherein the processor is further configured to execute the computer-executable instructions to cause the apparatus to display the map without any visual indicator over another area in which a number of data samples indicating the coverage deficiency in the other area does not exceed the predefined threshold.

12. The apparatus according to claim 9, wherein the area corresponds to a cluster of cell sites defined relative to a global Mercator projection.

13. A non-transitory computer-readable medium containing instructions for visualizing coverage area deficiencies on a map, which when executed by one or more processors cause an apparatus to:

retrieve network performance data from a plurality of user wireless mobile devices;

filter the network performance data to narrow the dataset to data samples with locations and dates; filter the dataset based on a preset location accuracy parameter;

count a number of data samples indicating a coverage deficiency in an area;

compare the number of data samples indicating the coverage deficiency in the with a predefined threshold;

render a map including the area; and display on the map a visual indicator of the coverage deficiency based on the number of data samples indicating the coverage deficiency in the area being determined to exceed the predefined threshold.

14. The non-transitory computer-readable medium according to claim 13, wherein the instructions further cause the apparatus to update the displaying of the visual indicator based on incoming network performance data retrieved from the data storage on a periodic basis.

15. The non-transitory computer-readable medium according to claim 13, wherein the visual indicator comprises a hexagon having a predetermined color corresponding to the coverage deficiency.

16. The non-transitory computer-readable medium according to claim 13, wherein the instructions cause the apparatus to display the map without any visual indicator over another area in which a number of data samples indicating the coverage deficiency in the other area does not exceed the predefined threshold.

17. The non-transitory computer-readable medium according to claim 13, wherein the network performance data comprises at least one of LTE network data and 5G network data.

18. The non-transitory computer-readable medium according to claim 13, wherein the area corresponds to a cluster of cell sites defined relative to a global Mercator projection.

* * * * *